US009382995B2

(12) United States Patent
Osborne et al.

(10) Patent No.: US 9,382,995 B2
(45) Date of Patent: Jul. 5, 2016

(54) PULLEY FOR USE WITH A NON-SYNCHRONOUS DRIVE BELT

(71) Applicants: Jonathan Osborne, Medical Lake, WA (US); Greg Lloyd, Spokane Valley, WA (US)

(72) Inventors: Jonathan Osborne, Medical Lake, WA (US); Greg Lloyd, Spokane Valley, WA (US)

(73) Assignee: EXTREME INDUSTRIAL COATINGS, LLC, Airway Heights, WA (US)

( * ) Notice: Subject to any disclaimer, the term of this patent is extended or adjusted under 35 U.S.C. 154(b) by 38 days.

(21) Appl. No.: 14/557,144

(22) Filed: Dec. 1, 2014

(65) Prior Publication Data

US 2016/0153543 A1    Jun. 2, 2016

(51) Int. Cl.
*B61F 17/14*     (2006.01)
*B61F 17/18*     (2006.01)
*F16H 55/38*    (2006.01)

(52) U.S. Cl.
CPC ..................................... *F16H 55/38* (2013.01)

(58) Field of Classification Search
CPC ......... F16H 55/38; F16H 55/56; F16H 55/36; B05D 2504/00; F16G 5/16
USPC .......................................... 474/166, 167, 237
See application file for complete search history.

(56) References Cited

U.S. PATENT DOCUMENTS

| | | | |
|---|---|---|---|
| 2,241,391 A | 5/1941 | Bollinger | |
| 2,643,549 A * | 6/1953 | Whitesell | B24B 21/14 152/393 |
| 2,836,982 A * | 6/1958 | Voss | D06F 58/08 152/323 |
| 3,430,506 A * | 3/1969 | Stone | B65G 23/06 198/835 |
| 3,498,817 A * | 3/1970 | Stone | B05D 3/0413 428/331 |
| 4,553,951 A * | 11/1985 | Pavone | F16G 1/28 346/139 A |
| 4,555,239 A | 11/1985 | Miranti, Jr. | |
| 4,781,660 A * | 11/1988 | Amataka et al. | F16H 9/24 474/174 |
| 4,838,842 A * | 6/1989 | Ohkata et al. | F16H 55/38 428/148 |
| 4,913,689 A * | 4/1990 | Morishita et al. | B21H 1/04 474/170 |
| 5,011,461 A * | 4/1991 | Brouwers | F16H 9/24 474/188 |
| 5,064,406 A * | 11/1991 | Schutte | B65G 23/04 193/37 |
| 5,119,924 A * | 6/1992 | Kaminski | B65G 23/06 198/803.15 |
| 5,507,698 A * | 4/1996 | Kuribayashi | F16H 55/48 474/170 |
| 5,518,460 A | 5/1996 | White, Jr. et al. | |
| 5,593,366 A * | 1/1997 | Puzik | F16H 7/02 474/177 |

(Continued)

FOREIGN PATENT DOCUMENTS

EP        0285729 A2    12/1988
EP         176360 B1     3/2013

(Continued)

OTHER PUBLICATIONS

PCT Search Report dated Apr. 22, 2016.

*Primary Examiner* — Henry Liu
(74) *Attorney, Agent, or Firm* — Randall Danskin PS (57) ABSTRACT

A pulley for use with a non-synchronous drive belt is described and which includes a main body having a belt mating surface which has a given surface area and which is further defined by a first bearing area, and a second rough area, and wherein the first bearing area comprises less than about 85% of the belt mating surface area.

1 Claim, 9 Drawing Sheets

(56) References Cited

U.S. PATENT DOCUMENTS

| | | | |
|---|---|---|---|
| 6,068,564 A | 5/2000 | Takahara | |
| 6,082,527 A | 7/2000 | Bruhmann et al. | |
| 6,254,503 B1* | 7/2001 | Chiba | F16H 55/56 29/894 |
| 6,672,983 B2* | 1/2004 | Mohr | F16G 1/28 474/152 |
| 6,938,508 B1 | 9/2005 | Saagge | |
| 7,050,605 B2 | 5/2006 | Gerson et al. | |
| 7,052,420 B2 | 5/2006 | King et al. | |
| 7,191,880 B2 | 3/2007 | Liston et al. | |
| 7,276,002 B2 | 10/2007 | Wang et al. | |
| 7,588,120 B2 | 9/2009 | Ha et al. | |
| 7,648,435 B2* | 1/2010 | Ishida | F16G 5/16 106/36 |
| 7,780,556 B2* | 8/2010 | Sakanaka | F16G 5/16 474/174 |
| 7,806,793 B2* | 10/2010 | Yoshida | F16G 5/16 474/188 |
| 8,020,669 B2* | 9/2011 | Aulanko | B66B 7/06 187/254 |
| 8,069,955 B2 | 12/2011 | Aulanko et al. | |
| 8,408,188 B1 | 4/2013 | Hormilla | |
| 8,814,735 B2* | 8/2014 | Toyohara | F16G 5/16 474/242 |
| 9,028,353 B1* | 5/2015 | Zimmer | F16H 55/36 474/166 |
| 2002/0119851 A1* | 8/2002 | Lukschandel | F16H 55/38 474/177 |
| 2005/0130781 A1* | 6/2005 | Feuerborn | F16G 5/20 474/237 |
| 2005/0217111 A1 | 10/2005 | Yoshida et al. | |
| 2009/0082148 A1* | 3/2009 | Van Der Leest | F16H 55/56 474/166 |
| 2010/0099522 A1* | 4/2010 | Ishida | F16G 5/16 474/8 |
| 2010/0160102 A1* | 6/2010 | Haag | C23C 22/53 474/166 |
| 2010/0190029 A1 | 7/2010 | Ueki | |
| 2012/0088615 A1 | 4/2012 | Briggs et al. | |
| 2015/0260271 A1* | 9/2015 | Zimmer | B23K 26/0078 474/8 |

FOREIGN PATENT DOCUMENTS

| | | |
|---|---|---|
| JP | 62037536 | 2/1987 |
| JP | 2005273720 A | 10/2005 |
| JP | 2008038973 A | 8/2006 |
| WO | 02090053 A1 | 11/2002 |
| WO | 2013155910 A1 | 10/2013 |

* cited by examiner

PULLEY FOR USE WITH A NON-SYNCHRONOUS DRIVE BELT

TECHNICAL FIELD

The present invention relates to a pulley for use with a non-synchronous drive belt, and more specifically to a pulley having a belt mating surface which produces a coefficient of friction which is equal to or greater than 0.4 and is further substantially tribologically benign to the non-synchronous drive belt.

BACKGROUND OF THE INVENTION

Power in the form of torque has been transferred from one location to another for thousands of years. In some of its earliest forms, belts formed of cordage-like material, animal leather and the like, were used to transmit torque at a distance to other objects. The present invention relates to a means which has been developed for reducing the slip experienced between resilient, elastomeric drive belts, such as flat belts, and V-belts, and which further mechanically cooperate with both pulleys and sheaves. As should be appreciated, the term "pulley" and "sheaves" typically have different meanings in different industries. In this document the word "sheave" is typically used with V-belts whereas "pulleys" are discussed in terms of either being a variable width sheave used, for example, in variable speed transmissions, or they are used with flat belts. In the present application, the term non-synchronous drive belt includes drive belts fabricated, at least in part, from synthetic, elastomeric material and further excludes synchronous belts such as timing belts which do not slip, but lack a self-protective clutching action when exposed to shock and power over-loads.

With regard to the present invention it should be understood that the phenomenon of belt slip is distinct from that of belt creep. Belt creep which typically occurs at a rate of about 0.5 to about 1%, is an inch worm—like effect which occurs at any given point along the path of belt movement as the non-synchronous drive belt moves through various tension gradients. Belt slip, on the other hand, results in the generation of elevated temperatures and other deleterious effects being imparted to the non-synchronous drive belt which forcibly engages a pulley or sheave.

Sheaves and V-belts are arranged to transmit mechanical power at high efficiencies. However, to achieve this objective, there must not be any appreciable belt slippage and only a certain amount of belt creep. The ability of a V-belt and sheave systems to perform in typical operational environments, as intended, has long posed a challenge for designers and users. In this regard, designers of drive systems have often failed to fully account for the real world interplay of variables like vibration, contamination, uncertain loads, and environmental conditions which diminish the amount of transmissible mechanical power to below expectations. Many have speculated that marketing pressures to keep purchasing costs low for such products have resulted in a pervasive lack of design robustness and reserve margin in the non-synchronous drive belts which are currently commercially available.

Those who are skilled in the art readily recognized that there is a natural tendency for end-users to ignore V-belt and sheave systems. Consequently, such systems tended to receive reactive rather than proactive and scheduled maintenance. This has caused incalculable losses due to wasted energy, costly parts replacement and lost productivity. A solution has long been needed to address these problems, but it has proven elusive. In this regard, V-belt and sheave systems tend to rely solely upon friction developed between the polymeric or elastomeric materials employed in these non-synchronous drive belts, and the accompanying metal sheave or pulley to function at some acceptable operational level. The coefficient of friction in these systems vary significantly in real world applications. For example, the coefficient of friction values are thought to range from about 0.2 for wet or dirty environments, to about 0.3 during normal operating conditions. In typical V-belt systems with their 40 degree included V-shape, the wedged coefficient of friction is thought to average about 0.5 under typical field conditions. Although belt slip is very common, all V-belt/sheave systems function properly only when they experience belt creep, and suffer no appreciable belt slip. As noted above, belt slip degrades real-world performance and produces deleterious friction-generated waste in the form of thermal power or what has been termed "heat load." Accordingly, a key object of designers through the years is to ensure that V-belts remain taunt with adequate tension for a reasonably long interval between scheduled maintenance. This objective is often subverted by a shortcoming inherent in common belt tensioners, and which typically use a spring to force an idling wheel into a force engaging location, mid-span, and into the side of the rotating non-synchronous drive belt.

The shortcomings in belt tensioners are well known, and they arise from the way in which these devices become increasingly ineffective as a system to prevent the problems associated with the generation of heat during operation, and which is caused by belt relaxation and expansion. Belt expansion, in turn, causes the idler device to deflect further into the belt path. This extra deflection diminishes the mechanical advantage provided when the belt and the associated pulleys are first tensioned into a proper relationship.

Over time, and due to the effect of the belt tensioner, a belt can become longer, and cause a corresponding amount of increasing belt slippage. Consequently, periodic maintenance is required to readjust the belt/drive system. As should be appreciated, this act of readjustment seems to be a bothersome shortcoming to many end-users. As a result, many end-users often respond to increasing belt slippage by moving the sheaves tighter, and further apart, thus increasing the strand tension often beyond industry recommended standards. Many users inevitably discover that by doing this act they dramatically diminish both the belt life, and the useful life of the bearings which rotatably support the pulley or sheave.

In addition to the problems noted above, V-belt systems often include insufficient reserve margin. In this regard, such V-belt systems are usually employed in high-powered mechanical systems. Further, these systems are often operated in harsh environments where adding robustness to the overall system poses cascading engineering consequences, such as, significant added costs, and increased use of space. Such mechanical systems have typically employed sophisticated belt tensioning devices that maintain essentially constant belt tension. However, real-world loads on these mechanical devices can be unpredictable, and can often be greater than what has been envisioned by engineering designers. Consequently, belt slip occurs even when systems are tensioned to appropriate and recommended manufacturer specifications.

Many operators of agricultural equipment are familiar with this phenomenon. If a belt drive system is equipped with a belt slip indicator, the operator has little choice when a belt slip indicator alarms but to reduce load (reduce engine power or somehow lessen the load demand on the system). In high power systems with no slip indicator, or one that is disregarded, excessive and persistent belt slip not only significantly diminishes the life of the non-synchronous drive belt, but also results in further system inefficiency and reduced productivity. Persistent belt slip ultimately results in system performance degradation often to the point of catastrophic system failure. If an adverse amount of heat is generated during operation, production or operations must typically be halted to allow the overall system to cool down. As those skilled in the art will recognize, ignored or unnoticed belt slip will often lead to a belt failure.

The problems associated with belt creep, and belt slippage, are well known. Belt slip causes three types of long term performance degradation which further exacerbates the problems noted, above. As a first matter, elastomeric, synthetic and non-synchronous drive belts that run or experience hot operating temperatures due to belt slip and/or creep will eventually harden from a durometer of Shore 70A, to a slick, urethane-like Shore 45D. The underlying mechanism of belt hardening is well known, and is one of thermo-oxidation which causes a post-process molecular cross-linking. As will be understood, the very high temperatures arising from prolonged and excessive belt slip can rapidly, that is, in a matter of weeks, harden and glaze non-synchronous drive belts to a point where they must be replaced because they have less friction, and even more belt slip than what was experienced during their original installation. Secondly, belt slip is known to be a mildly abrasive process that slowly polishes (glazes) sheaves and associated pulleys. Additionally, metal smearing can occur with sheaves manufactured from aluminum, and also can occur in ones fabricated from steel under certain circumstances. Thirdly, the abrasive action that causes the glazing of sheaves, and pulleys, can also produce or form undulations in the V-shaped profiles of the sheaves which are installed. These undulations diminish the belt's wedging action. Several interacting phenomena are at play when this occurs in a drive belt system. Suffice it to say that a glazed sheave having profile undulations is especially incompatible with a thermo-oxidized, non-synchronous drive belt.

The prior art is replete with various prior art references which teach assorted ways to produce a high coefficient of friction surface on a sheave or pulley. Some of these teachings have entailed the creation of macro-sized features such as ribs, slots and dimples on the belt contact surface of the respective sheaves or pulleys. However, these structures have all been shown to accelerate belt wear. Other prior art references have taught the creation of micro-sized texturing on the metal sheave surfaces. However, this texturing has also accelerated belt wear. Further, many users have discovered that this fine texturing often was worn away by the belt-slip action of the non-synchronous drive belt. Other possible solutions to the problems noted, above, and which were designed to obtain a high coefficient of friction surface, that didn't wear away, involved the embedding of a wear-resistant abrasive, that being, a ceramic or other mineral, into the sheaves themselves. These prior art embodiments featured particle sizes that could be seen with the naked eye, whereas others featured very small particles which could not be readily visibly discerned. However, since non-synchronous drive belts running on abrasive coated sheaves boasting a high coefficient of friction still experience belt creep, and further since V-belts dynamically wedge in or out of a 40° included angle at least four times per belt revolution, abrasive coated sheaves experience poor belt life. This is unsurprising since one of the defining characteristics of abrasive powders, besides being harder than the materials being abraded, is that they have sharp cutting edges.

Therefore, what is needed to solve the aforementioned problems is to provide a surface or surface treatment that improves the coefficient of friction between a sheave or other drive pulley and drive belt, and that further doesn't simultaneously abrade the belt, and which additionally allows the drive belt to run at a cooler temperature, and with less thermal oxidation. In high power mechanical applications, a significant improvement in the coefficient of friction would permit a reduction in the number of grooves formed in the sheave; and a cascading series of engineering benefits would ensue. Ideally, a solution to this long felt need would also make sheaves and pulleys resistant to glazing and groove profile changes.

An invention which avoids the detriments associated with the prior art practices and devices utilized, heretofore, is the subject matter of the present application.

SUMMARY OF THE INVENTION

A first aspect of the present invention relates to a pulley for use with a non-synchronous drive belt which includes a main body having a belt mating surface which has a given surface area, and which further is defined by a first bearing area, and a second rough area, and wherein the first bearing area comprises less than about 85% of the belt mating surface area.

Still another aspect of the present invention relates to a drive pulley for use with a non-synchronous drive belt which includes a main body defining a belt mating surface, and which has a given surface area, and wherein the non-synchronous drive belt is fabricated, at least in part, of a resilient, synthetic material, and wherein the belt mating surface produces a coefficient of friction which is equal to, or greater than 0.4, and is further substantially tribologically benign to the non-synchronous drive belt.

These and other aspects of the present invention will be discussed in greater detail hereinafter.

BRIEF DESCRIPTION OF THE DRAWINGS

The preferred embodiments of the invention are described below with reference to the following accompanying drawings:

FIG. 3A is a greatly enlarged, simplified, vertical, sectional view taken through a portion of the belt mating surface of a pulley having the features of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article I, Section 8).

Figure 1:
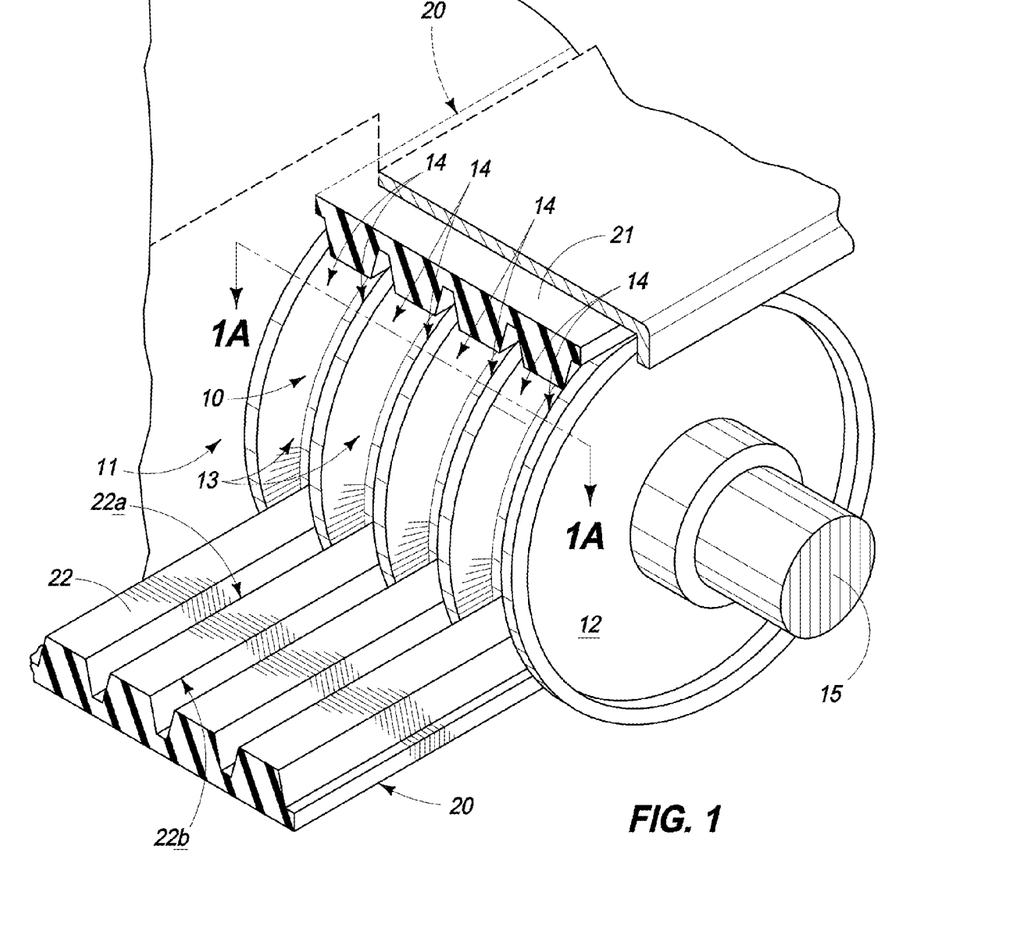
FIG. 1 is a partial, perspective, environmental view of a mechanical device bearing a rotatable pulley in cooperative engagement with a non-synchronous drive belt of conventional design.
Figure 1A:
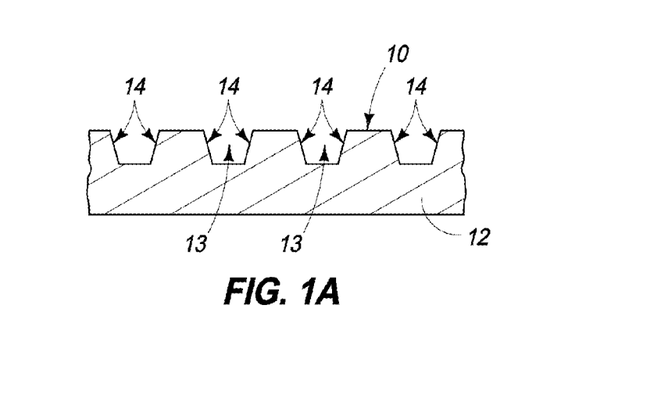
FIG. 1A is a transverse radially inwardly directed sectional view taken from a position along line 1A-1A in FIG. 1.
Figure 4:
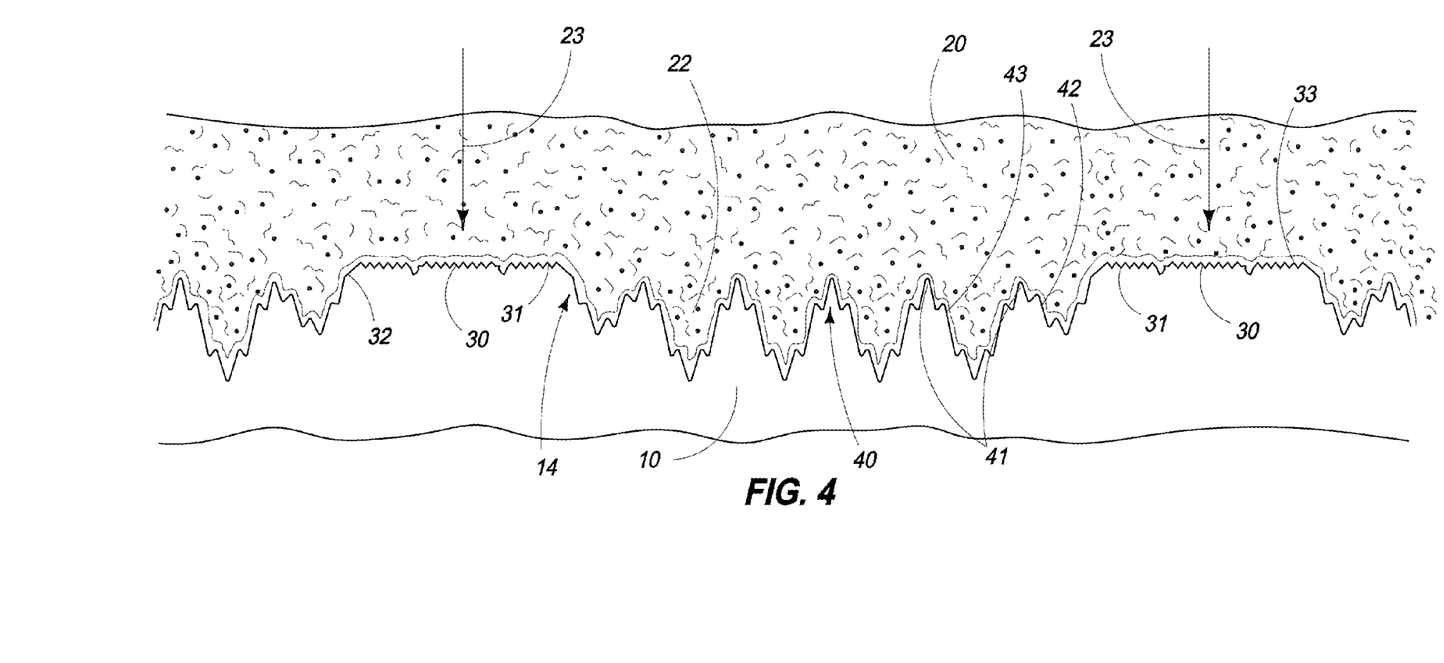
FIG. 4 is a greatly enlarged, simplified, transverse vertical sectional view of a belt mating surface employed in a pulley of the present invention and which shows a portion of a non-synchronous drive belt in force engaging contact therewith.

Referring now to FIG. 1, the present invention relates to a pulley which is generally indicated by the numeral 10, and which is for use with a non-synchronous drive belt as will be described, below. In the prevent invention the word "pulley" should be understood to be synonymous with the word "sheave" and which is often used in other industry segments. The pulley of the present invention 10 is drivingly coupled to a mechanical device which is generally indicated by the numeral 11 in FIG. 1. The mechanical device includes a rotatable shaft 15, and which is supported by a bearing, not shown. The pulley 10 is fixed to the shaft 15, and co-rotates therewith. This arrangement is well known in the art. The pulley or sheave 10 includes a main body 12 which is circular in shape, and which defines a multiplicity of circumscribing belt grooves or channels 13 which are formed in the circumscribing peripheral edge of the main body 12. The multiplicity of belt grooves or channels 13 each are defined a pair of spaced belt-mating surfaces 14 (FIG. 1A). As seen in FIG. 1, the non-synchronous drive belt 20 forcibly engages the respective belt mating surfaces 14. A coefficient of friction, therefore, is established or exists between each of the belt mating surfaces 14, and the non-synchronous drive belt 20. The non-synchronous drive belt 20 is fabricated, at least in part, of a resilient, synthetic and polymeric material. In the arrangement as shown in the drawings, the belt mating surfaces 14 produce a coefficient of friction, which is equal to or greater than 0.4, and is further substantially tribologically benign to the non-synchronous drive belt 20. The non-synchronous drive belt 20 has a top, outwardly facing, non-pulley engaging surface 21; and an opposite, bottom, inwardly facing or pulley engaging surface 22. The bottom surface is defined, at least in part, by pairs of spaced sidewalls 22A and 22B, and which matingly, and frictionally engage the spaced belt mating surfaces 14 as defined by the pulley 10. The spaced sidewalls 22A and 22B which form a portion of the bottom surface 22 of the non-synchronous drive belt 20 generate an inwardly directed force which is indicated by the arrows labeled 23, as seen in FIG. 4, onto the respective belt mating surfaces 14. The inwardly directed force 23 is distributed across the belt mating surface 14 in a pattern as will be discussed, below, and which inhibits the abrasion of the bottom surface 22 of the non-synchronous drive belt 20 while simultaneously maintaining a coefficient of friction which allows the mechanical device 11 to operate effectively. As should be understood from a study of the drawings (FIG. 1A), the belt mating surfaces 14 each have a predetermined surface area which is operably engaged by the individual spaced sidewalls 22A and 22B, and which form a portion of the bottom surface 22 of the non-synchronous drive belt 20.

Figure 2:
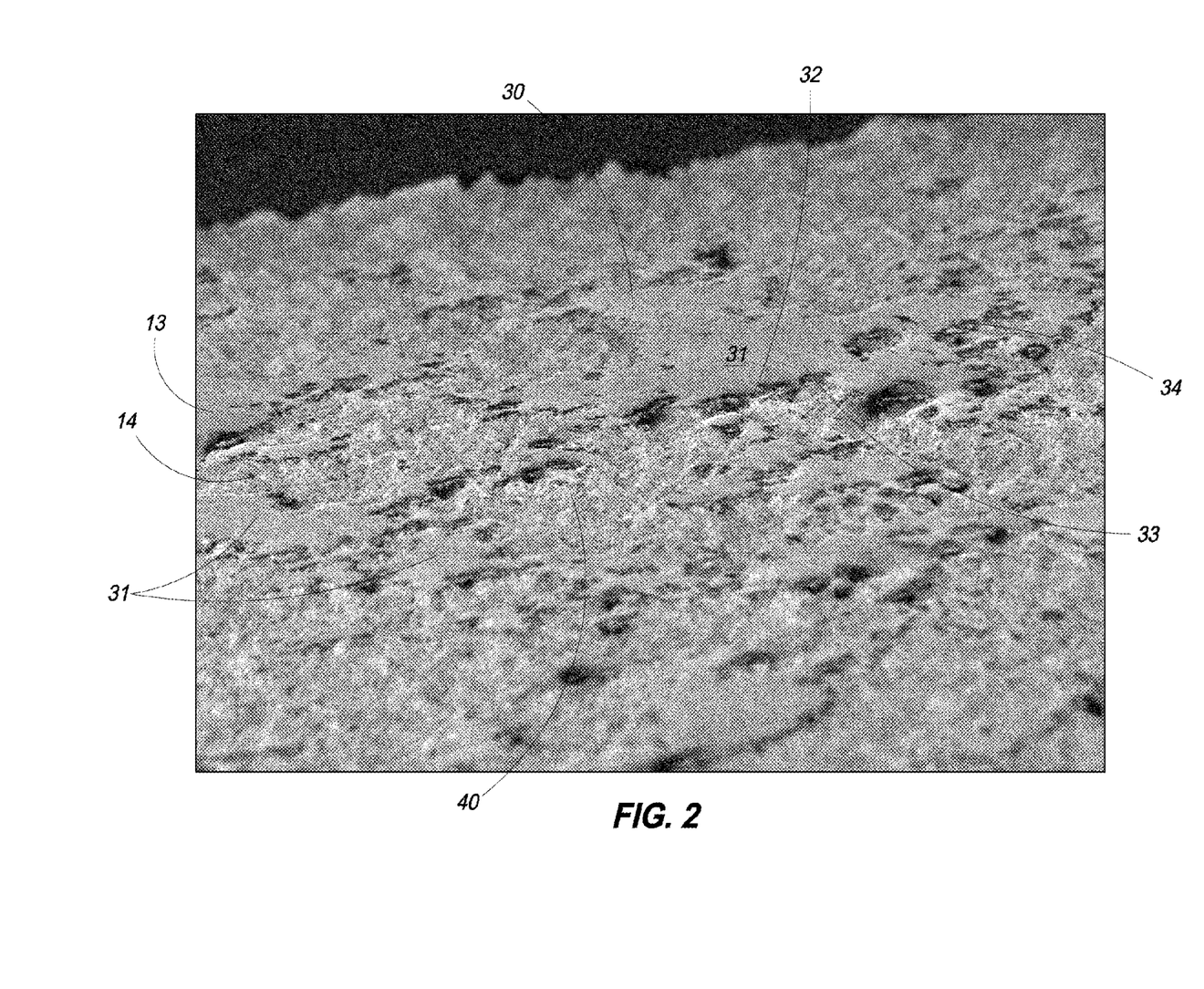
FIG. 2 is a photographic, greatly enlarged, perspective view of a pulley having a belt mating surface having the features of the present invention.
Figure 2A:
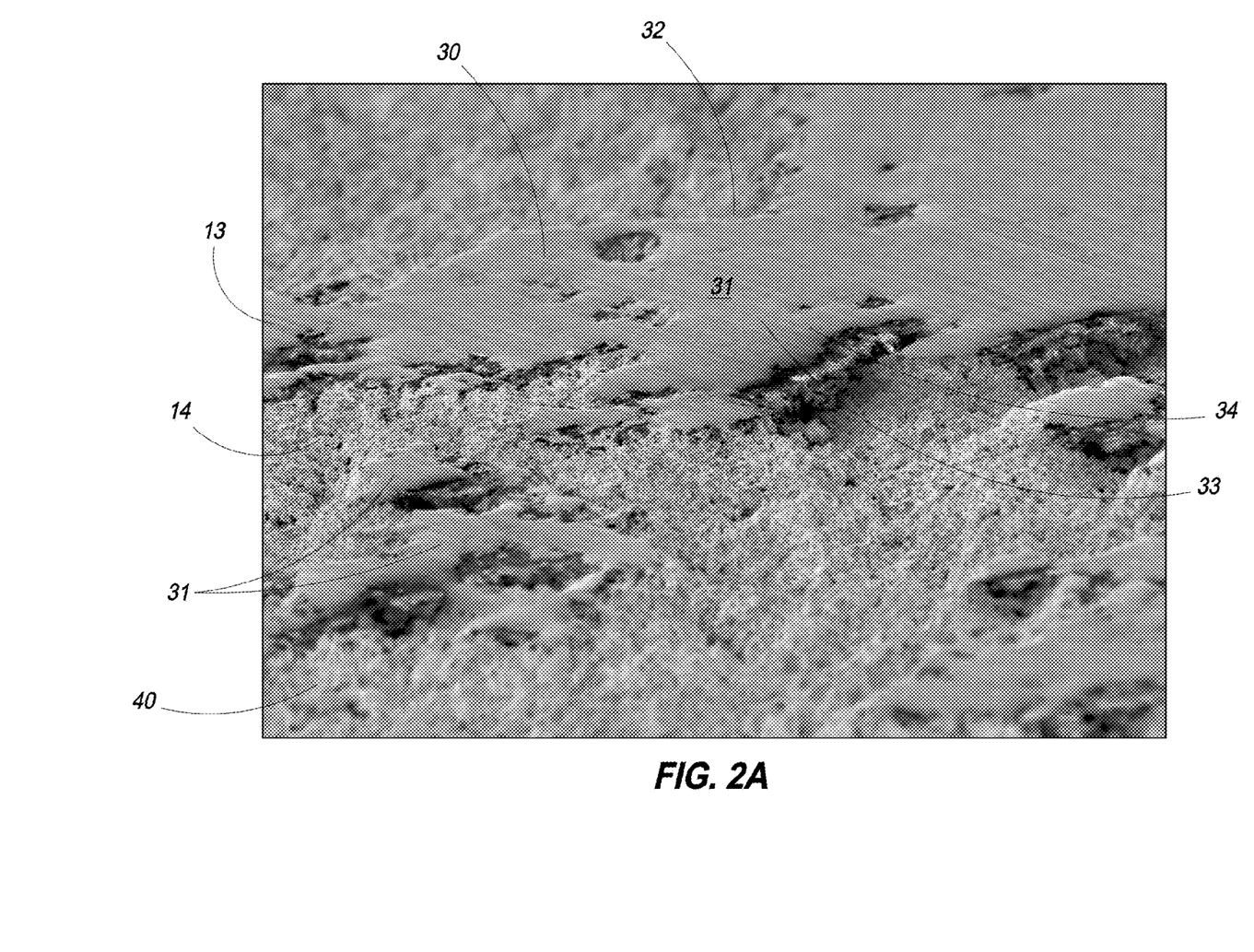
FIG. 2A is a second, photographic, greatly enlarged perspective view of a belt mating surface having the features of the present invention.
Figure 3:
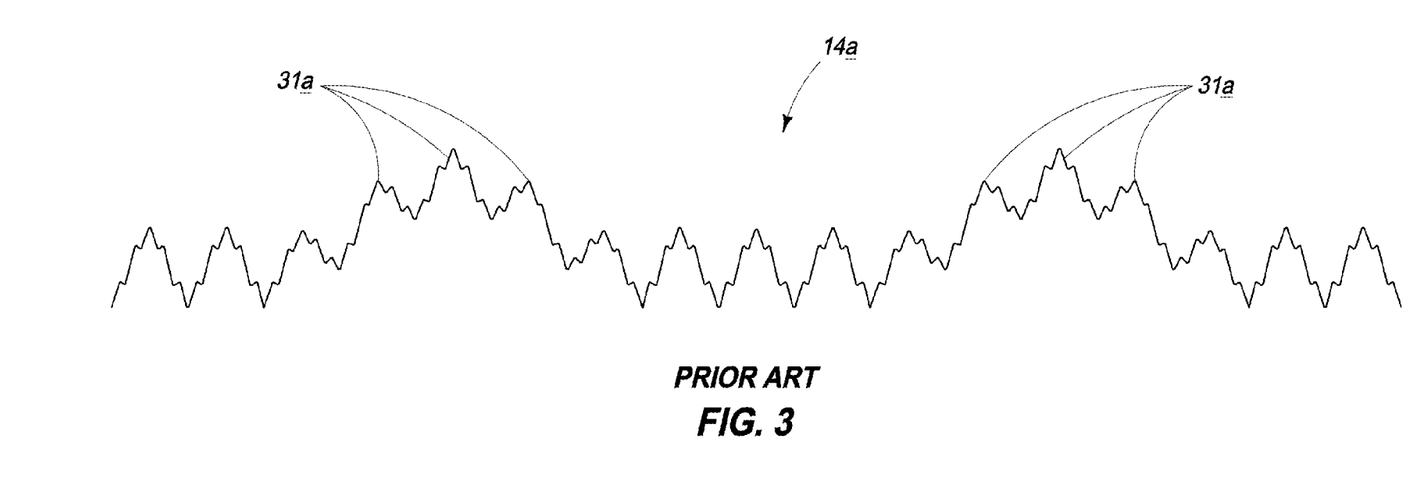
FIG. 3 is a greatly enlarged, simplified, vertical sectional view taken through a portion of a belt mating surface of a prior art pulley which has been fabricated using prior art techniques.

Referring now to FIGS. 2 and 2A, and as noted above, the present invention includes belt mating surfaces 14 which are defined, at least in part, by a first bearing area 30. The first bearing area 30 is formed of a dispersion of discreet truncated peaks or mesa-like areas 31 having a median height. The respective dispersion of truncated peaks 31 are defined by a generally vertically oriented sidewall 32, and a top, generally planar surface 33. Still further the first bearing area 30 which is formed of the truncated peaks 31 have different, random lengths, widths and height dimensions. Further, and as should be understood by a study of FIG. 4, the respective dispersion of truncated peaks 31 forcibly engage the resilient material forming, at least in part, the non-synchronous drive belt 20. In this regard, the dispersion of truncated peaks 31, and which are defined by the top surface 33, sidewall 32, and various edges 34, do not substantially abrade the non-synchronous drive belt 20 because these surfaces have been blunted or otherwise rounded-off by a manufacturing step which has been undertaken during the fabrication of the invention. Referring now to FIG. 3, which is a greatly simplified depiction of a prior art belt mating surface 14A, it will be appreciated that this depicted region is exemplified by numerous peaks 31A and other sharped-edged topography which can significantly penetrate, and then cause abrasion of a non-synchronous drive belt which forcibly engages same. As seen in the drawings (FIG. 4), the resilient material forming the spaced sidewalls 22A and 22B of the bottom surface 22 of the non-synchronous drive belt 20 conformably mates, at least in part, with the irregular and random surface character of the first bearing area 30, and second rough area 40 so as to increase the amount of friction which is generated between the non-synchronous drive belt 20, and the belt mating surfaces 14 as defined by the pulley 10. It should be appreciated from a study of the drawings that the first bearing area 30 has an irregular and random surface character, and which is developed by various means as will be discussed in the paragraphs which follow.

The belt mating surfaces 14 are each further defined by a second, rough area which is generally indicated by the numeral 40 (FIGS. 2 and 2A). The second rough area is dispersed between, and located adjacent to the first bearing area 30. In the spatial arrangement as seen in the drawings (FIG. 3A), the second rough area 40 has a median height which is about 25 micrometers less than the median height of the adjacent first bearing area 30. The non-synchronous drive belt 20, as earlier noted, is fabricated, at least in part, of a synthetic, polymeric, and resilient material which engages, and resiliently deforms to the belt mating surfaces 14 (FIG. 4), and which is defined by the first bearing area 30, and the second rough area 40. In the arrangement as seen in the drawings (FIGS. 2 and 2A), the belt mating surfaces 14 each have an average surface roughness (Ra) which lies in a range of about 1 to about 50 micrometers. Again, as noted above, the second rough area 40 of each of the belt mating surfaces 14, have an irregular, and random surface character which includes a multiplicity of peaks and edges 41 and 43, respectively (FIG. 3A), and which further have different and random lengths and depth dimensions. Still further, the second rough area 40 is defined by sidewalls 42. The peaks and edges 41 and 43 of the rough area 40 forcibly engage the resilient material forming at least in part the non-synchronous drive belt 20 (FIG. 4). Again as described, above, and with respect to the first bearing area 30, the second rough area 40 operates in a similar manner, and where the peaks and edges 41 and 43 are formed in a fashion where they do not substantially abrade the bottom surface 22 of the non-synchronous drive belt 20. As again seen in the drawings, and as should be understood, the resilient material of the non-synchronous drive belt 20 conformably mates, at least in part, with the irregular and random surface character of each of the first bearing area 30, and the second rough area 40, to increase the amount of friction which is generated between the non-synchronous drive belt 20, and the respective belt mating surfaces 14.

As should be understood, the surface character or topography of the first bearing area 30, and the second rough area 40 is developed in one form of the invention, at least in part, by electropolishing. In an alternative form of the invention, the surface character of the first bearing area 30, and second rough area 40 is developed, at least in part, by mechanical abrasive removal. In the arrangement as seen in the drawings, it has been previously noted, above, that the median height of the second rough area 40 is less than the median height of the elevated first bearing area 30. In the arrangement as seen in the drawings (FIG. 3A), the respective belt mating surfaces 14 are defined by a surface profile which includes the relative heights of the respective truncated peaks 32 of the elevated first bearing area 30, and the relative heights of the discreet peaks 41 of the second rough area 40. In the arrangement as seen in the drawings (FIG. 2), the multiplicity of discreet truncated peaks 31 comprises about 1% to about 85% of the surface area of the belt mating surfaces 14.

Figure 3B:
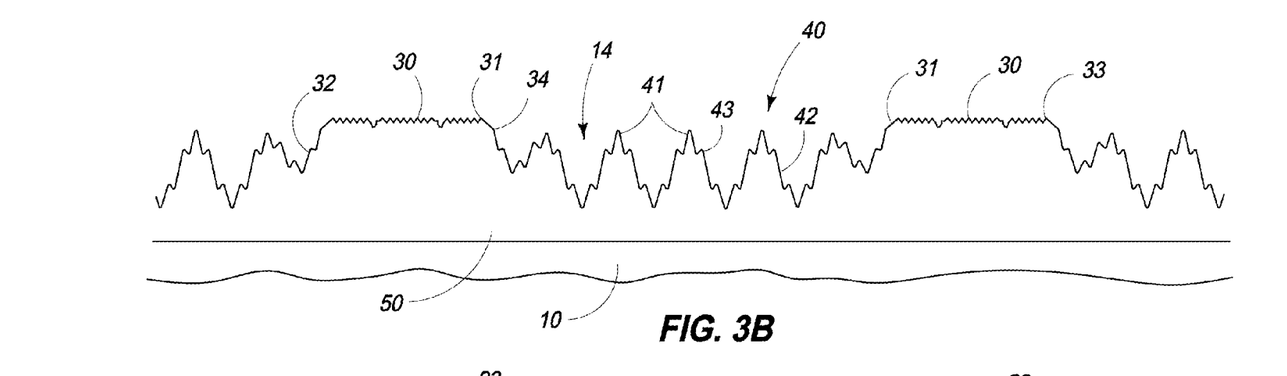
FIG. 3B is a greatly enlarged, simplified, vertical sectional view taken through a portion of the belt mating surface of a second form of a pulley having the features of the present invention.
Figure 5:
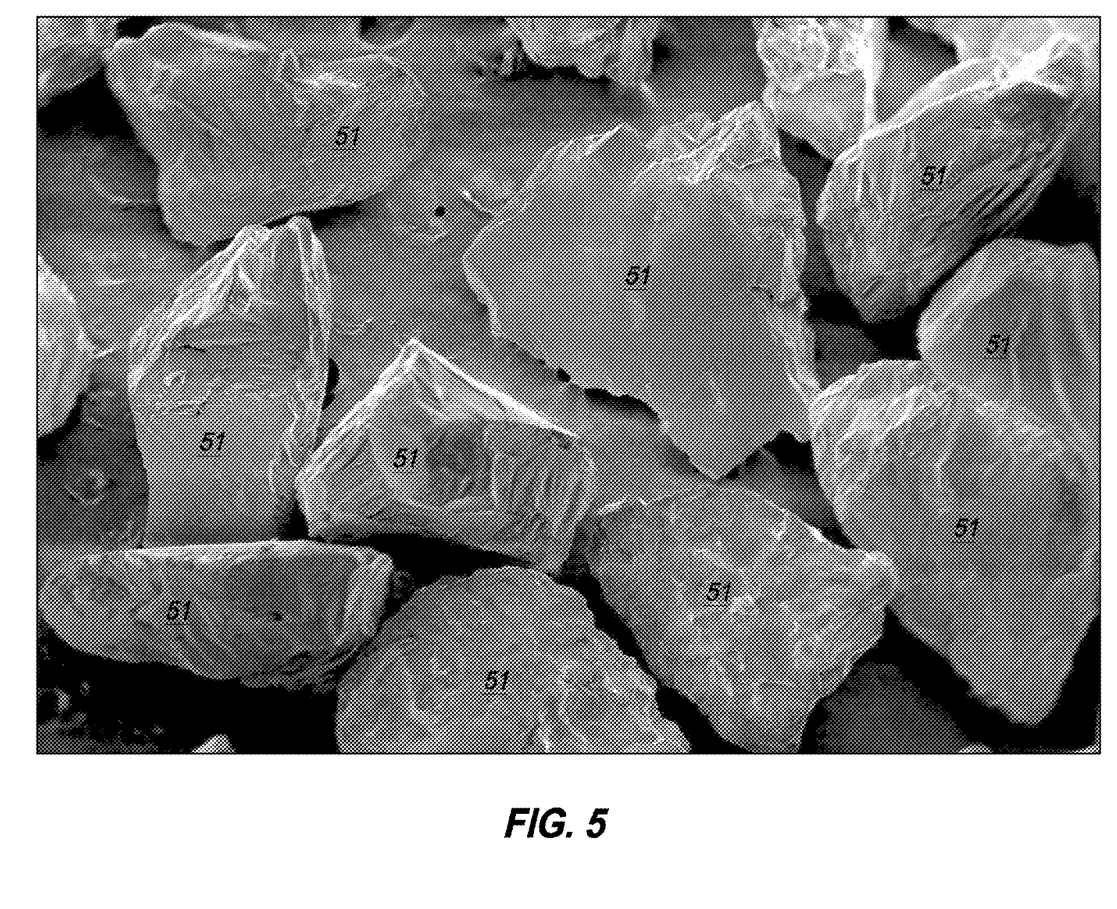
FIG. 5 is a photographic, greatly enlarged, perspective view of a coarse grit which is employed in the fabrication of the pulley having the features of the present invention.
Figure 6:
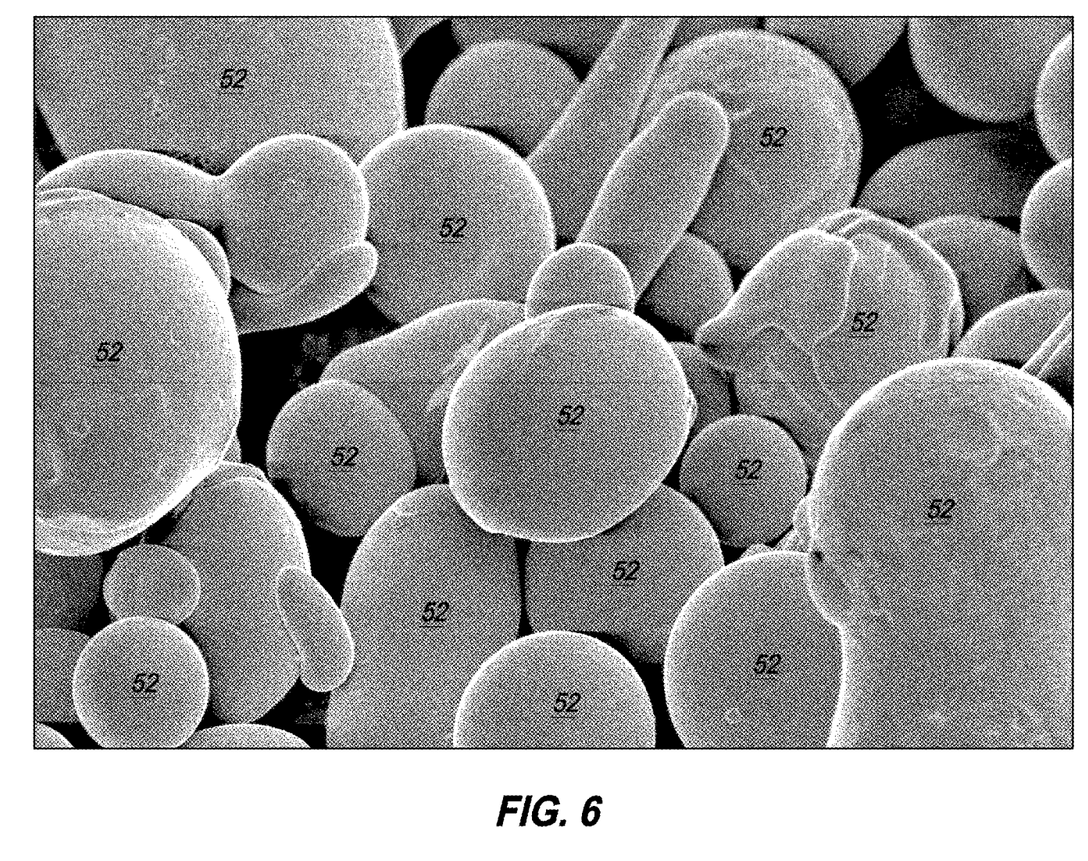
FIG. 6 is a photographic, greatly enlarged, perspective view of a spherical grit which is employed in the fabrication of the pulley having the features of the present invention.
Figure 7A:
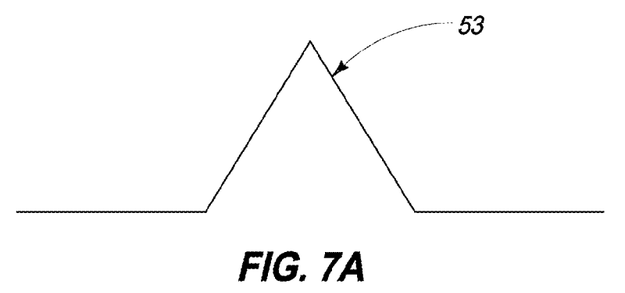
FIG. 7A is a greatly enlarged, simplified, vertical sectional view of a first iteration of a self-similar fractal geometry of the belt mating surface employed with the pulley of the present invention.
Figure 7B:
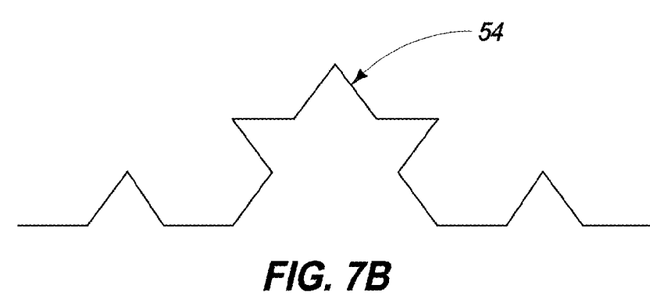
FIG. 7B is a greatly enlarged, simplified, vertical sectional view of a second iteration of a self-similar fractal geometry as employed in the pulley of the present invention.
Figure 7C:
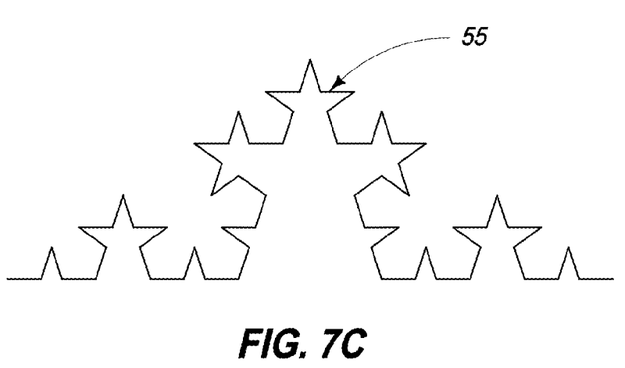
FIG. 7C is a greatly enlarged, simplified, vertical sectional view of a third iteration of a self-similar fractal geometry which forms a feature of the present invention.
Figure 7D:
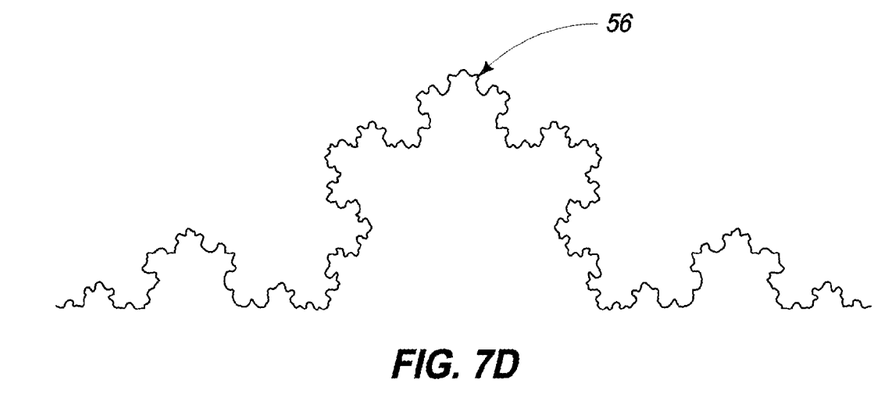
FIG. 7D is a greatly enlarged, simplified, vertical sectional view of a fourth iteration of a self-similar fractal geometry which forms a feature of the present invention.

In one possible form of the invention (FIG. 3B) a surface coating 50 is applied to the pulley 10. In this arrangement, the first bearing area 30, and the second rough area 40 are formed, at least in part, within the surface coating 50. In this arrangement, and when properly formed, the surface coating 50 has a surface porosity of greater than about 15%. Stated somewhat differently the surface area of the second rough area 40 is greater than 15%. In this form of the invention (FIG. 3B), the surface coating 50 is formed over the top of the belt mating surface 14, of the pulley 10, by a thermal spray powder, not shown, and which is formed, at least in part, by a volume of non-crushed ceramic particles (such as agglomerated forms of precipitated particles) which are admixed with a metal binder. The non-crushed ceramic particles and the admixed metal binder are both well known in the art, and are not discussed in further detail, herein. In another possible iteration of the present invention, the surface coating 50 is formed over, and on, the belt mating surface 14 of the pulley 10 by a thermal spray powder, and which is formed, at least in part, by a volume of a nano-crystalline alloy. Again, this thermal spray powder technique is also well known in the art, and is not discussed in further detail herein. With regard to the surface coating 50, the truncated peaks 31, which form the first bearing area 30, may be formed by means of mechanical abrasive removal, grinding, or sanding. Still further, the surface character of the belt mating surfaces 14, as seen in either form of the invention as described, above, may include at least two fractal iterations of scale as seen in FIGS. 7A-7D respectively. It should be understood that the least two fractal iterations of scale may be formed by first, grit blasting the belt mating surface 14 of the pulley 10 with a crushed angular grit 51 (FIG. 5); and secondly, blasting the belt mating surface 14 with a predominately spherical bead-like grit 52 (FIG. 6). First, second, third and fourth fractal iterations of scale are seen in FIGS. 7A through 7D, respectively, and are each individually indicated by the numerals 53 through 56, respectively. As should be understood, the belt mating surfaces 14 may be hardened to create additional fractal-type iterations of scale to change the resulting coefficient of friction. In the present invention, the truncated peaks 31, in one possible form of the invention, are provided by the displacement of at least a portion of the first bearing surface 30 by way of surface rolling; shot peening; bead blasting; or hammer peening. In the several forms of the invention as currently disclosed, the second rough area 40 may be formed by way of an electrospark deposition. Further, the second rough area 40 may be formed or fabricated by way of a powdered metallurgy. In the case of the electrospark deposition and powdered metallurgy, these techniques are well known in the art, and a further discussion is not warranted. In the arrangement as described above, and in another possible form of the invention, the pulley 10 may be put through a hardening process, or the surface coating 50 may be hardened in order to provide the appropriate surface character necessary to perform the objectives of the present invention.

Operation

The operation of the described embodiments of the present invention is believed to be readily apparent, and is briefly summarized at this point.

In its broadest aspect, a pulley 10 for use with a non-synchronous drive belt 20 includes a main body 12 which defines belt mating surfaces 14, and which further have a given surface area. The non-synchronous drive belt 20 is fabricated, at least in part, of a resilient, synthetic, material. The belt mating surfaces 14 produce a non-wedged coefficient of friction which is equal to, or greater than, about 0.4, and is further substantially tribologically benign to the non-synchronous drive belt 20. As noted above, the belt mating surfaces 14 are defined, in part, by a first elevated bearing area 30 which is formed of individual truncated peaks 31 having a median height; and a second rough area 40, having discreet peaks 41, and which is located adjacent to the first bearing area 30. The second rough area 40 has a median height which is less than the median height of the elevated first bearing area 30. The belt mating surfaces 14 are defined by a surface profile which includes the relative heights of the respective truncated peaks 31 of the elevated first bearing area 30; and the relative height of the discreet peaks of the second rough area 40. As earlier noted, a significant portion of the surface profile of the pulley 10 is typically located below the elevated first bearing area 30.

As discussed, above, the elevated first bearing area 30, and the second rough area 40 are substantially devoid of sharp edges which can abrade the resilient non-synchronous drive belt 20. In the arrangement as seen in the drawings, the non-synchronous drive belt 20 exerts a predetermined amount of force 23 which is directed inwardly onto the belt mating surface 14. The amount of force exerted by the drive belt 20 onto the second rough area 40 is diminished by the amount of force applied to the elevated first bearing area 30 thereof. The inventors believe this spatial arrangement of the first and second areas 30 and 40, respectively, is effective in causing the exceedingly good performance of the pulley 10, inasmuch as friction is maximized, while eliminating, to the extent possible, any abrasion of the non-synchronous drive belt 20. The surface character of a pulley or sheave of traditional design is seen in FIG. 3. As should be understood the belt mating surfaces 14A which are formed by traditional fabrication techniques, are typically characterized my rather sharp peaks 31A. These peaks 31A penetrate a distance into the bottom sidewall surfaces 22A and 22B, of the non-synchronous belt 20. When belt slip or belt creep occurs it is this type of surface topography which abrades the non-synchronous belt 20. The inventors believe that the aforementioned spatial arrangement of the present invention allows an effective amount of friction to be generated, but prohibits the peaks of the second rough area 40 from significantly penetrating into the non-synchronous drive belt 20. In this arrangement, when belt slip of belt creep occurs, abrasion of the non-synchronous drive belt 20 is avoided. When friction is maximized belt slip can be avoided, and heat is reduced. A reduction in heat build-up impedes the elongation of the non-synchronous drive belt 20, and thus further reduces the occasion for belt slip. Consequently, deterioration of the non-synchronous drive belt 20 is significantly reduced. In field tests where the pulley 10 of the present invention has been installed on harvesting equipment during actual harvesting operations, operators of this same equipment have experienced at least a 25% increased torque delivered by the harvesting equipment when compared to harvester performance using traditional pulleys. This is indeed a surprising result in view of the previous developments in pulley fabrication, and which have, in no reported instance, ever increased torque to the degree which was measured during the field trials conducted just prior to the filing of the present application, without first causing a corresponding, and noticeable abrasion of the nonsynchronous drive belt. In the arrangement as seen in the drawings, the elevated first bearing area 30 of the surface coating 50 which is defined by the multiplicity of discreet and truncated peaks 31 comprises 1% to about 85% of the surface area of the belt mating surfaces 14. As earlier noted, the surface coating 50, in one form the invention, may be applied to the belt mating surfaces 14, and the elevated first bearing area 30 which is formed in the surface coating 50 is defined at least in part by a surface coating have a porosity of greater than 15%.

Figure 4A:
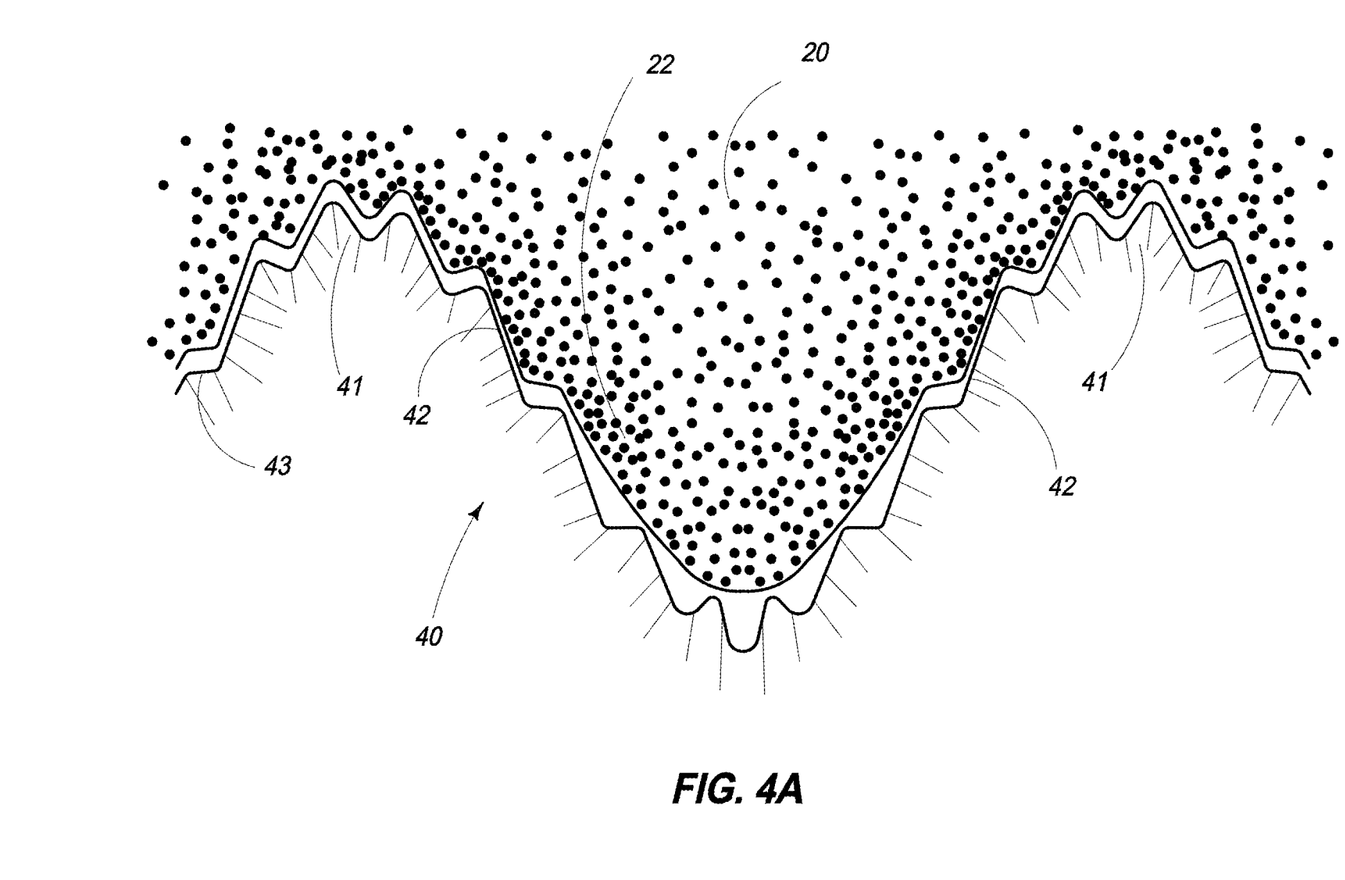
FIG. 4A is a greatly enlarged, simplified, vertical sectional view of a belt mating surface in contact with the non-synchronous drive belt as illustrated in FIG. 4.

As noted above, it appears from an analysis of the performance of mechanical devices 11, such as crop harvesters, and the like, that the present pulley 10 provides superior performance when compared to prior art pulleys and sheaves fabricated using prior art techniques. The inventors believe that the superior performance of the aforementioned belt mating surfaces 14 are a result of the surface characteristics as provided by the first bearing area 30, and second rough area 40. The coefficient of friction which is developed appears related to the spatial and topographical arrangement of the surfaces 30 and 40 inasmuch as the second rough area 40, while operable to effectively frictionally engage the bottom surface 22 of the non-synchronous drive belt 20, it accomplishes this engagement in such a fashion that it does not substantially abrade or deteriorate the bottom surface 22 because it experiences less inwardly directed pressure 23 which is generated by the non-synchronous drive belt 20 because of the presence of the elevated first bearing area 30 which is located adjacent thereto. Stated somewhat differently, the point-contact pressure experienced by the peaks 41 of the second rough area 40, are greatly diminished by the removal of the peaks 31A when the first bearing area 30 is formed. This attenuates the point contact pressure on peaks 41 in the second rough area 40. Further, the belt mating surfaces 14 are fabricated in a manner whereby there are no sharp edges or peaks which can further degrade the non-synchronous drive belt 20. On the other hand, the variable surface characteristics of the first bearing area 30 versus the second rough area 40 is created, in part, by a fractal geometry as seen in FIG. 7A-7D, respectively, such that the resilient material which makes up at least a part of the non-synchronous drive belt 20 (FIG. 4) conformably engages multiple fractal like scale iterations (FIG. 4A) so as to increase the coefficient of friction to a level which remains tribologically benign to the non-synchronous drive belt while maintaining a novel, and enhanced coefficient of friction.

Therefore, the pulley as described, and which is used with a non-synchronous drive belt 20 provides many advantages over the prior art arrangements used, heretofore, and further operates to increase the efficiency of various mechanical devices while remaining substantially tribologically benign to the non-synchronous drive belt 20 which is employed with same.

In compliance with the statute the invention has been described in language more or less specific as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims as appropriately interpreted in the doctrine equivalence.

We claim:

1. A pulley having at least one circumscribing belt groove and which is defined by spaced, belt-mating surfaces, and wherein the belt groove further matingly, and frictionally cooperates with a pair of spaced sidewalls of an unlubricated, resilient, non-metallic, and non-synchronous drive belt, comprising:

a pulley main body which defines at least one circumscribing belt groove, and wherein the belt groove is defined, in part, by a pair of spaced, belt-mating surfaces each having a given surface area, and predetermined surface texture, and wherein the surface texture of the respective, spaced, belt-mating surfaces is characterized, in part, by a first bearing area, and a second, rough area, and wherein the first bearing area is smooth, and is formed of a dispersion of truncated peaks having a predetermined median height dimension, and wherein the first bearing area has a surface area which is less than about 85% of the surface area of each of the spaced, belt-mating surfaces of the pulley main body, and wherein the second, rough area is defined by a multiplicity of discrete peaks which have a median height dimension which is at least 25 micrometers less than the median height dimension of the truncated peaks forming the first bearing area, and wherein the first bearing area, and the second rough area are substantially devoid of sharp edges, and wherein a preponderance of the surface area of the pair of spaced, belt mating surfaces is defined by the second, rough area, and wherein the non-synchronous drive belt exerts a predetermined amount of force onto the belt mating surface, and wherein the amount of force exerted by the non-synchronous drive belt on the second, rough area is diminished by the amount of force applied to the elevated, first bearing area, so as to inhibit an abrasion of the non-synchronous drive belt, while simultaneously producing a coefficient of friction with the unlubricated, resilient, non-metallic and non-synchronous drive belt which is equal to or greater than 0.4.

\* \* \* \* \*